United States Patent Office 2,783,191
Patented Feb. 26, 1957

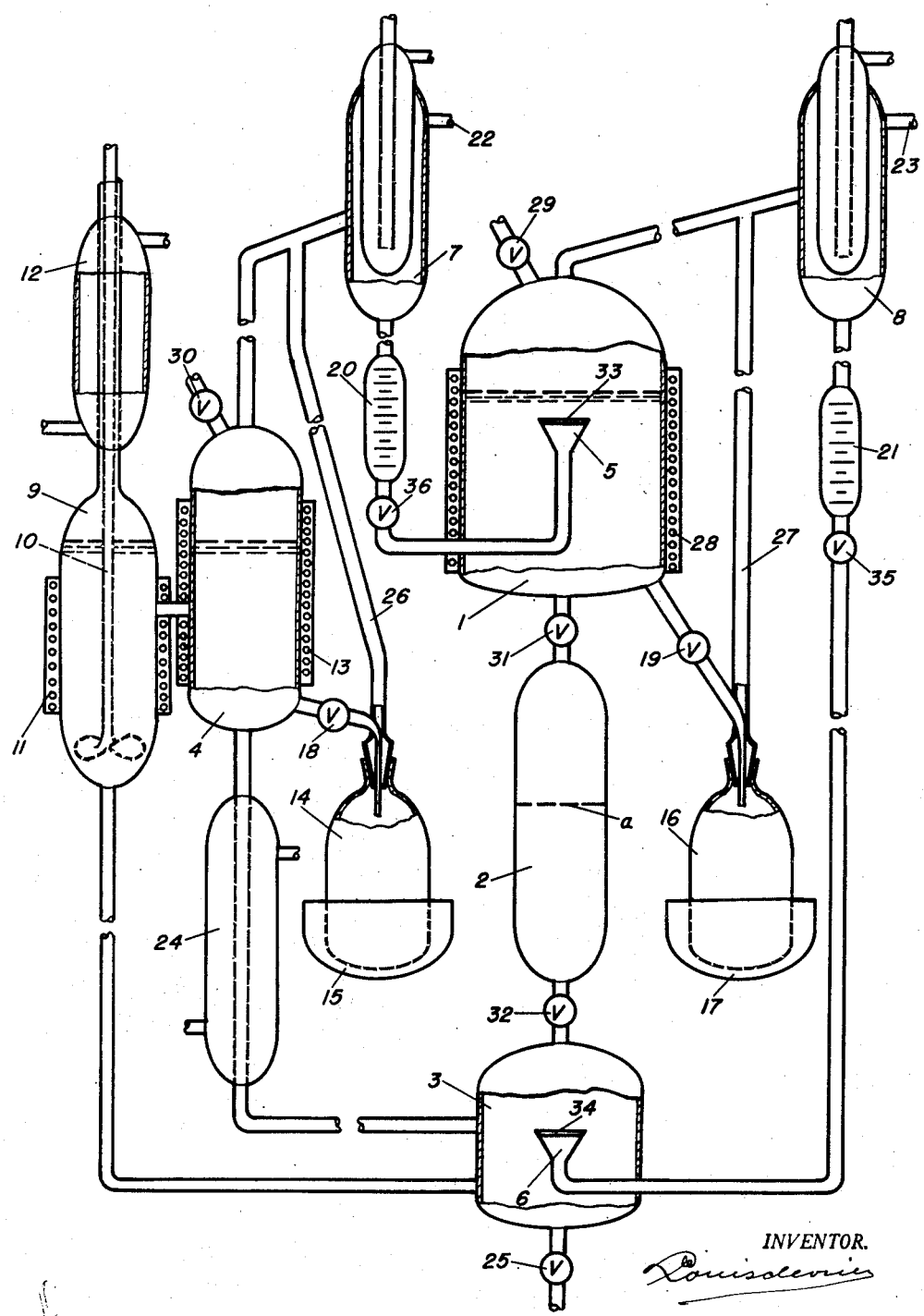
FIG. I

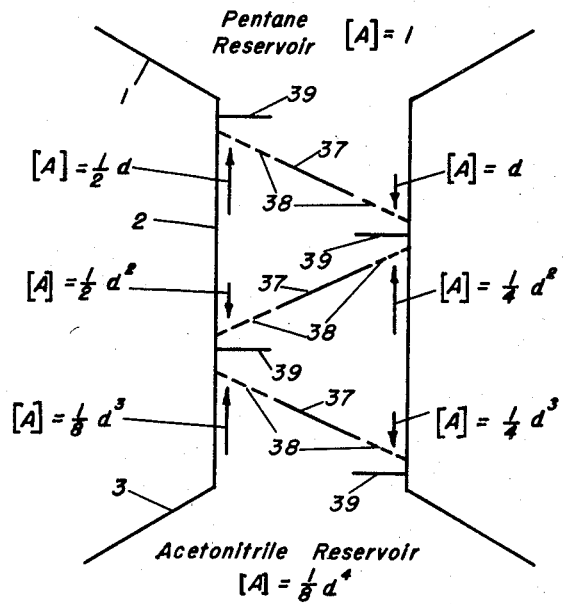
FIG. II

2,783,191

FRACTIONATING CONTINUOUS LIQUID-LIQUID EXTRACTOR

Louis de Vries, Los Angeles, Calif.

Application June 3, 1954, Serial No. 434,169

1 Claim. (Cl. 202—169)

This invention relates to a fractionating continuous liquid-liquid extractor, in which a light phase continually extracts a heavy phase and conversely, both phases moving countercurrent and equilibrium being established. It is an object of the invention:

First: to provide a means for the effective separation of substances inseparable or unsatisfactorily separable by other methods, such as distillation, crystallization and chromatography, due to decomposition or other undesirable chemical reactions during such processes or insufficient difference in those properties on which the separation method is based.

Second: To provide a fractionating continuous liquid-liquid extractor which can be operated in a simple manner, requiring only relatively small amounts of solvents and requiring no moving parts except for a stirrer and which is adaptable to laboratory as well as large scale operation.

In the drawings:

Fig. 1 is a schematic representation of a front elevation of a preferred embodiment of the invention.

Fig. 2 is a diagrammatic view of the countercurrent column and its connections to the light phase and heavy phase reservoirs, with legends indicating such concentrations of the solute at different points in the two phases as satisfy the material balance requirements of solute equilibrium.

Referring to Fig. 1: A countercurrent column 2 is located between a light phase reservoir 1 and a heavy phase reservoir 3. Heavy phase from reservoir 3 is drawn by stirrer 10 through vessel 9 and thence passed toward a second heavy phase reservoir 4 through the action of a motor driven stirrer 10 provided with propeller blades rotating inside a stirrer vessel 9. Heavy phase is returned from reservoir 4 to reservoir 3 through a watercooled jacket 24. When the stirrer is rotating a slow continuous interchange of liquid between reservoirs 4 and 3 is thus achieved, securing identical solute concentrations in those reservoirs.

The heavy phase in reservoir 4 is heated to boiling by means of the electrical heating jacket 13 and is preheated in the stirrer vessel 9 by means of the heating jacket 11. In order to prevent loss of solvent from the stirrer vessel through evaporation the stirrer passes through the bore of a reflux condenser 12.

The heavy phase distilling from reservoir 4 condenses in the watercooled reflux-condenser 7. A graduated tube 20 with a stopcock is provided to measure the rate of distillation of the heavy phase. When this stopcock is in the open position the heavy phase distillate flows through the heavy phase spray-nozzle 5, inside the light phase reservoir 1 and is dispersed by the sintered glass plate 33. After passing through the light phase in reservoir 1 and through the countercurrent column 2 the heavy phase drops join the heavy phase in reservoir 3. The light phase in reservoir 1 is heated to its boiling point by means of the electrical heating jacket 28 and condenses in the water-cooled reflux condenser 8. The rate of distillation of the light phase can be measured by means of a graduated tube 21 with a stopcock 35. When this stopcock is in the open position the light phase flows through the light phase spray-nozzle 6 inside the heavy phase reservoir 3 and is dispersed by the sintered glass plate 34. After passing through the heavy phase in reservoir 3 and through the countercurrent column 2 the light phase drops join the light phase in reservoir 1.

Thus a continuous extraction takes place of the heavy phase by the light phase and conversely; countercurrent extraction in column 2 increasing the efficiency of separation of solutes greatly as will be shown below. The heavy phase in reservoir 3 is at room temperature so that the low boiling light phase extracting it, does not boil; however, the high boiling heavy phase can pass through the boiling light phase in reservoir 1 without disadvantage.

The whole apparatus is at atmospheric pressure, openings 23 and 22 in the condensers being open to the atmosphere and the condenser 12 over the stirrer vessel being open to the atmosphere at its upper end.

When solute is recovered from the heavy phase, liquid from reservoir 4 is allowed to drip into a heavy phase evaporation vessel 14, the rate of flow being very slow and regulated by a stopcock 18. Vessel 14 is heated in a bath 15, for instance, a steam bath, to a temperature high enough to boil off the heavy phase without causing decomposition of the residue. The heavy phase distilling from vessel 14 passes through a tube 26 and condenses in the reflux condenser 7 together with the vapors from reservoir 4.

When solute is collected from the light phase, liquid from reservoir 1 is allowed to drip into a light phase evaporation vessel 16, the rate of flow being very slow and regulated by a stopcock 19. Vessel 16 is heated in a bath 17 to a temperature high enough to boil off the light phase without causing decomposition of the residue. The light phase distilling from vessel 16 passes through a tube 27 and condenses in condenser 8 together with the vapors from reservoir 1. Vessels 14 and 16 are detachable and interchangeable and when detached the stopcocks 18 and 19 may serve to empty the reservoirs 4 and 1. A stopcock 25 is provided near the bottom of reservoir 3 for drainage, stopcock 30 in reservoir 4 serves for adding of the heavy phase and stopcock 29 in reservoir 1 serves for adding of the light phase. Stopcocks 31 and 32 at the top and at the bottom of the countercurrent column 2 may be used during filling of the apparatus and may be used in draining of heavy or light phase only.

The method is limited to immiscible solvent pairs which can be distilled at reasonably low temperatures. As a general rule one solvent is of high polarity and the other is of low polarity. Suitable solvent combinations are the following:

Water and benezene, hexane, pentane or ether.
Acetonitrile and pentane or hexane.
Dimethylformamide and hexane or pentane.

Numerous other solvent combinations are possible, a preferred combination being acetonitrile (Boiling Pt. 81°), pentane (Boiling Pt. 35°–45°).

When hydrostatic equilibrium is obtained the interphase between light and heavy phase is located at or near a plane "$a$" through the middle of the countercurrent column and the light phase level in vessel 1 is slightly higher than the heavy phase level in vessels 4 and 9.

Fig. 2 serves to illustrate the equilibrium concentration of a solute A at different points in the countercurrent column 2 and in the light phase reservoir 1 and the heavy phase reservoir 3. The light phase is taken to be pentane, the heavy phase acetonitrile. The design of the countercurrent column in the drawing, although unessential to the invention, will be explained for added clarity: The column 2 is divided into two or more compartments by partitions 37, tilted relative to the vertical axis of the column and having perforated sections 38, diametrically located at the highest and lowest portion of the partition, the highest portion of each partition being near the lowest portion of the partition above it, a horizontal baffle 39 being located between the two adjoining perforated sections in order to prevent straight passage of the heavy phase accumulated over the upper perforated section to the lower perforated section or straight passage of the light phase accumulated under the lower perforated section to the upper perforated section. Thus the heavy and light phase are forced to cross each other in a dispersed state in each compartment and in the illustrated example it is assumed that a theoretical contact is established in each compartment. The concentration of a solute A is represented as [A] and the values are given for the case in which the concentration of A in the pentane reservoir is equal to "one" and the distribution ratio of A between acetonitrile and pentane is equal to "$d$." It is furthermore assumed that "$d$" remains constant over the range of concentrations under consideration. The short arrows pointing downward represent one volume of acetonitrile. The long arrows pointing upward represent two volumes of pentane, the rates of distillation of pentane and acetonitrile being adjusted such that two volumes of pentane distill for each volume of acetonitrile.

The material balance at equilibrium requires that the amount of A in the acetonitrile entering the top of the countercurrent column after extracting the pentane solution in the pentane reservoir be equal to the amount of A in the pentane leaving the countercurrent column and joining the pentane in the pentane reservoir, the same requirement applies to the amounts of A in the pentane entering the bottom of the countercurrent column after extracting the acetonitrile in the acetonitrile reservoir and the acetonitrile leaving the column and joining the acetonitrile in the acetonitrile reservoir. In order to satisfy this requirement a total exchange of solute must take place between the pentane and the acetonitrile at each theoretical contact and consequently in each compartment of the countercurrent column.

This leads to the concentration values indicated in Fig. 2.

The result can be generalized in the following formulas for the case that a total of one weight unit of solute A and a total of one weight unit of solute B is present in a total of one volume unit of the heavy phase and a total of one volume unit of the light phase.

In the heavy phase reservoir:

$$[A]_h = \frac{a^{(n+2)}}{a^{(n+2)} + f^{(n+1)}} \quad [B]_h = \frac{b^{(n+2)}}{b^{(n+2)} + f^{(n+1)}}$$

In the light phase reservoir:

$$[A] = \frac{f^{(n+1)}}{a^{(n+2)} + f^{(n+1)}} \quad [B] = \frac{f^{(n+1)}}{b^{(n+2)} + f^{(n+1)}}$$

[A] = concentration of A
[B] = concentration of B
$a$ = distribution ratio of A between heavy and light phase
$b$ = distribution ratio of B between heavy and light phase
$n$ = number of theoretical contacts or number of stages in the countercurrent column
$f$ = ratio of volumes of light phase and heavy phase distilling in unit time In a concrete example in which both A and B are considerably more soluble in the heavy phase than in the light phase $a=5$, $b=3$, $f=3$, $n=4$. Again a total of one weight unit of A and a total of one weight unit of B is present in a total of one volume unit of the heavy phase and a total of one volume unit of the light phase.

Consequently in the heavy phase:

$$[A]_h = \frac{5^6}{5^6 + 3^5} = .988$$

$$[B]_h = \frac{3^6}{3^6 + 3^5} = .75$$

$$\frac{[A]_h}{[B]_h} = \frac{.988}{.75} = 1.32$$

In the light phase:

$$[A] = \frac{3^5}{5^6 + 3^5} = .012$$

$$[B] = \frac{3^5}{3^6 + 3^5} = .25$$

$$\frac{[B]}{[A]} = \frac{.25}{.012} = 20.84$$

These figures show that the bulk of both compounds stays in the heavy phase and no purified material can be obtained from that phase. However, in the light phase the concentration of B is about twenty times the concentration of A. Consequently, draining of the light phase after solute equilibrium is established and evaporation of the solvent leaves highly purified B. New light phase is now substituted for the quantity removed and after equilibrium is reestablished the light phase is drained again and yields after evaporation of the solvent a residue which again contains B in large excess over A.

Since the original amounts of A and B present as solutes were equal and much more B than A is removed it is obvious that after each repetition of this operation the excess of B over A in the residue from the light phase diminishes and calculation shows that in the given example after 11 repetitions the amounts of A and B are approximately equal in the residue. At this point most of B has been removed and evaporation of the solvent from the heavy phase leaves a residue containing 86% of total original amount of A in a purity of 96%. When all residues obtained from the light phase are added they are found to contain 96.5% of the total original amount of B in a purity of 87.3%. Recycling of the latter material will give B in much higher purity. This illustrates the separation obtainable in the indicated manner assuming constant distribution ratios over large concentration ranges, an assumption which is certainly only approximately correct in most cases and the given calculation has only qualitative value.

Different values of "$f$" and "$n$" are required for best results in different cases. This is illustrated by the following figures: In case $a=5$ and $b=3$ as in the above example, but $f=2$ and $n=3$, it is necessary to drain the light phase 44 times, and replace it by fresh solvent in order to obtain 75% of the total original amount of A in a purity of 93% after evaporation of the heavy phase.

In case the distribution ratios are not too close it is equally possible to adapt the conditions to the separation of three or more substances. For the ease of calculation it has been assumed in the above example that one of the phases is completely drained after equilibrium is established and replaced by fresh solvent. In the embodiment shown in Fig. 1 the withdrawal of either phase may be effected continuously. The solvent is immediately evaporated upon entering vessel 14 or 16 and returned, so that the total amount of solvent, effective in the equilibration stays constant, thus avoiding the handling of large volumes of solvent. The drainage into the evaporation vessel may be effected intermittently by the use of an electronic timing device or continuously at such a slow rate as to maintain solute equilibrium between the two phases. I have illustrated and described my invention in a practical embodiment thereof. I have not attempted to illustrate or describe other adaptations or embodiments which I contemplate as I believe this disclosure will enable those skilled in the art to embody or adapt my invention as may be desired.

What is claimed is:

The apparatus for separating two difficultly separable components of limited volatility from a mixture, in which said compounds are dissolved in a first solvent as two solutes therein, the three component solution is subjected to countercurrent solvent extraction in a countercurrent column with a second solvent, differing in density from said first solvent, said solutes having different distribution ratios between said two solvents, heavy solvent is distilled continuously from heavy phase containing solutes, which is drawn from the bottom of said countercurrent column, said distilled heavy solvent is returned continuously to the top of said countercurrent column, and the remainder of said heavy phase, containing solutes is returned continuously after cooling, to the bottom of said countercurrent column, light solvent is distilled continuously from light phase containing solutes in the top of the column and said light solvent is returned to the bottom of said countercurrent column, separated solute is withdrawn from one of said distilling phases by evaporation of solvent and return of the solvent vapors to the system, which comprises a countercurrent solvent extraction column, means for distilling light solvent from light phase in the top of said column, means for condensing said distilled light solvent and means for returning said condensed light solvent to the bottom of said column, means for drawing light phase from the top of said column, means for evaporating light solvent and depositing solutes from said withdrawn light phase, means for condensing said evaporated light solvent and means for returning said condensed light solvent to the bottom of said column, means for withdrawing heavy phase containing solutes from the bottom of said column, means for partially distilling heavy solvent from said withdrawn heavy phase, means for returning residual heavy phase, containing solutes to the bottom of said column, means for cooling said returning heavy phase, means for condensing said distilled heavy solvent and means for returning said condensed heavy solvent to the top of said column, means for withdrawing heavy phase containing solutes from said means for distilling heavy phase, means for evaporating heavy solvent and depositing solutes from said withdrawn heavy phase, means for condensing said evaporated heavy solvent and means for returning said condensed heavy solvent to the top of said column.

References Cited in the file of this patent

UNITED STATES PATENTS

| 2,614,031 | Tickler | Oct. 14, 1952 |

FOREIGN PATENTS

| 166,921 | Austria | Oct. 10, 1950 |
| 844,363 | Germany | Sept. 29, 1952 |